United States Patent
Weisz et al.

[11] Patent Number: 6,148,406
[45] Date of Patent: Nov. 14, 2000

[54] ACCESS CONTROL PASSWORD GENERATED AS A FUNCTION OF RANDOM NUMBERS

[76] Inventors: Herman Weisz, Cogels-Osylei 33, B-2600 Berchem, Belgium; Ornella Lo Piano, Via Oddo delle Colonne Is.O, I-98100 Messina, Italy

[21] Appl. No.: 08/930,517
[22] PCT Filed: Feb. 12, 1996
[86] PCT No.: PCT/EP95/05181
§ 371 Date: Sep. 30, 1997
§ 102(e) Date: Sep. 30, 1997
[87] PCT Pub. No.: WO96/34328
PCT Pub. Date: Oct. 31, 1997

[30] Foreign Application Priority Data

Apr. 27, 1995 [BE] Belgium .................................. 9500386
Sep. 28, 1995 [BE] Belgium .................................. 9500805

[51] Int. Cl.[7] .................................................... G06F 1/00
[52] U.S. Cl. .................................................... 713/202
[58] Field of Search .................................. 380/25, 23, 4; 713/202, 200, 184, 182

[56] References Cited

U.S. PATENT DOCUMENTS

| | | | |
|---|---|---|---|
| 4,679,236 | 7/1987 | Davies | 380/23 |
| 4,819,267 | 4/1989 | Cargile et al. | 380/23 |
| 4,926,481 | 5/1990 | Collins, Jr. | 380/25 |
| 5,060,263 | 10/1991 | Bosen et al. | 380/25 |
| 5,163,097 | 11/1992 | Pegg | 380/21 |
| 5,177,789 | 1/1993 | Covert | 380/23 |
| 5,588,056 | 12/1996 | Ganesan | 380/4 |

Primary Examiner—Tod R. Swann
Assistant Examiner—Matthew Smithers
Attorney, Agent, or Firm—Browdy and Neimark

[57] ABSTRACT

A method and a security system for applying this method, for securing a device by making use of a security system equipped with a logic control device (1), includes assigning a personal code Y to each user, who from such code Y and from a series Ai of at least a random number, letter and/or symbol determines a password Z, and enters this password Z in the logic control device, and where access to the secured device is granted when the password Z is correctly entered, whereby the personal code is used having at least two distinct parts, whereby a first part is formed by an index I and a second part is formed by a figure code X, whereby the user of this index I determines which element out of series is used to form the password Z out of the figure code X by an operation or a function.

10 Claims, 1 Drawing Sheet

ACCESS CONTROL PASSWORD GENERATED AS A FUNCTION OF RANDOM NUMBERS

The invention concerns a method for ensuring the security of a device, as described in the preamble to claim 1.

In known security systems, checking of the person demanding access to a device such as a database, file or building is done by means of a logic control device. Said logic control device can be a mainframe computer monitoring a large number of accesses simultaneously, or a microprocessor monitoring a limited number of entrances, e.g. the access to a building.

In such security systems, each authorised user has both a personal code or password being stored in the logic control device, and a system code, where an unambiguous relationship exists between the system code for a person and his personal code or password. Whenever a person wishes to gain access to the security system, he communicates his system code to the security system. The computer verifies whether this is correct. If the system code is correct, the user is generally asked to enter his password or personal code into the computer. This is compared with the personal code stored in the computer. Only if both are identical does the security system permit access. Such a system code can take various forms, such as the known magnetic card, the recognition of a voice, a standardised figure and/or letter combination, etc.

Such security systems however do not have a maximum level of security, since the system code in the form of a magnetic card, for example, can be lost or stolen. Furthermore, it is known that magnetic cards can be easily damaged. Also, in these known systems, the same code is always entered, holding the danger that the code may be discovered by another person.

In German patent application 3 904 215, a first embodiment of a method is described in which a user possesses an identification card and a personal code consisting of figures indicating an element of a series of random figures, where said element is then entered into a logic device in order to gain access to a secured system. However, a third person who observes the user, and thus knows the figures entered as well as the series of random figures, can without difficulty deduce what the personal code of the user is. Accordingly, said third person, once he has obtained possession of said identification card, can gain access to the secured system.

In a second embodiment of the above-mentioned German patent application, the result of an operation between a random number and a personal code is entered as the password into the secured system. An observer who observes the user, and thus who knows the random number, the password entered and the operation applied, can easily deduce the user's personal code from these, and so can gain access to the secured system if he obtains possession of the corresponding identification card.

American patent U.S. Pat. No. 4,679,236 describes a method for securing a device in which a user possesses an identification device which, on the basis of a random number issued by a logic control device and subsequently entered in said identification device, calculates a password on the basis of a preprogrammed function.

This method also has the disadvantage that a person who observes the random number displayed on the screen, and the figures of the password entered on the keyboard, can calculate the preprogrammed function from them. If this person obtains possession of the identification device, he does not even have to calculate this function in order to obtain access to the secured device, but can simply enter the codes observed.

In the method according to American patent U.S. Pat. No. 5,1177,789, a user is assigned a personal figure code in which each figure of this code indicates a position in a series of random figures. When this user wishes to access a secured system, various series of random figures are communicated to the user, who has to enter in a logic control device the figures located at a position in a series given by the figures of his personal code.

An unauthorised person who observes the actions of the user can however deduce the corresponding position in a series, from the figures entered, and so can deduce the user's personal code.

As explained briefly above, the codes for the security systems in the above-mentioned patents are easy to discover, since there is always an unambiguous relationship between the code peculiar to the user and the password to be entered, where the required figures or passwords always appear on screen or have to be entered on a keyboard. These systems also require an identification device such as a magnetic card or chip card. Said device can be stolen or lost, and so come into the possession of an unauthorised person.

The invention has as its aim to provide a method not having the above-mentioned disadvantages, and in which it is almost impossible to deduce a user's personal code.

To this end, a function and/or operation is applied to the series of random elements Ai mentioned in the introduction to claim 1, enabling an element to be obtained which can be different from that determined by said index I, on the basis of which the password Z is generated.

In a preferred embodiment of the method according to the invention, a personal code Y is used, consisting of at least two separate parts, where a first part is formed by said index I and a second part by a figure code X, and where the user applies said function and/or an operation to said figure code X and at least one element of said series Ai, so as to generate the password Z.

In a particularly preferred embodiment of the method according to the invention, a personal code Y is used containing an index operator B consisting of at least one number, and which with the help of the index I makes it possible to determine which element in said series is used to generate said password Z.

In a specific, preferred embodiment, a series Ai of random numbers with an index series Ji is generated, where an operation is carried out between a number b of said index operator B and a number Aij of said series Ai, which number Aij belongs to an index j of said index series Ji, where the index j corresponds to an element of the index I, and the result of said operation determines a new index element indicating the number in a series of random numbers, whereupon an operation is carried out with at least one element of the personal figure code X in order to calculate a number Zi of the password Z to be entered.

The invention also relates to a security system for carrying out the method according to the invention.

An essential characteristic of the invention is that the personal data, entered by the user in the form of said password with the security system, always varies randomly. In this way it is almost impossible for external observers, e.g. people who wish to break into computer files in an organised way, to find out personal codes.

To this end, the security system has a personal code Y for each user, being known to the corresponding user. Said personal code Y consists of a personal index I and a personal figure code X.

The personal index I comprises r elements $i_1, i_2, \ldots i_r$, formed by figures and/or letters and/or symbols, where $r>0$. The figure code X consists of a series of n numbers with $n \geq 0$. The individual numbers of the series are indicated henceforth by $X1, X2, \ldots, Xi, \ldots Xn$, where Xi is the i-th number of the series X, which can assume all negative or positive integer or decimal values, or the figure zero. The personal code can also consist of only an index I (in which case n=0). A specific example of a personal code is D2357, where the letter D is the user's personal index I and the figures 2357 are the user's personal code X.

Another example is a personal index I consisting of the letter word "VEILIG" without personal figure code X, or with all Xi=0. Yet another example is the code "GELD2378" with as personal index I the letter word "GELD" and as figure code x the number 2378.

The system further comprises means for generating series Ai with a finite number of random numbers, and for assigning a peculiar system index j to each of the numbers generated. Said system index j can be a number or figure, a letter or a symbol. The system indexes j belonging to a certain number series Ai form a system index series Ji. Although it is preferable for the numbers of the random series ("randomrij") to be positive integers, it is also possible to use decimal and negative numbers or zero.

The security system also comprises means for determining a mathematical operation F between the numbers of the user's personal figure code X and the numbers of at least one series Ai dependent on the system index Ji. This is represented symbolically by F(X, Ai, Ji).

The security system further comprises means for defining a password Z, defined by said operation F. Since the result of the operation F depends on at least one series Ai of random numbers, the password Z will be different each time the user wishes to obtain access to the system.

If personal figure code X has n numbers, the password Z will consist of a series Z of p numbers with p=n, p>n or p<n, where $p \leq 1$. The numbers of this series are henceforth named $Z1, Z2, \ldots Zi, \ldots Zp$, where Zi is the i-th element of the number series Z with $1 \leq i \leq p$.

For the further description, it is assumed that the security system generates t series Ai of q random numbers Aij with $1 \leq t \leq p$, where Aij is the j-th number of the i-th series. p is the number of numbers Zi forming the password Z.

Further, Ji is a system index series consisting of k indexes $j_1, j_2, \ldots j_1, \ldots j_k$ for the i-th number series Ai, with Ai being the number series with q random numbers generated just before entering the i-th number Zi of the password Z, and with $0 \leq k \leq q$. Note that each series Ji always has to include an element from the personal index I.

In general, the password Z is obtained by applying an operation or function F to the numbers Xi of the personal figure code X, the elements $i_i$ of the personal index I, the elements of the different system index series Ji and the numbers of the series Ai. In symbolic terms, this is noted as $Z=F(X, I, (J1, J2, \ldots, Jt), (A1, A2, \ldots At))$. Since a user who enters a password Z does not have to reveal his personal index I or his personal figure code X to the security system, a third person cannot find out the user's personal code, and so cannot himself enter a correct password, since this password is constructed anew on each use, among other things on the basis of random numbers.

Other features and advantages of the invention will be apparent from the following description of some particular embodiments of the method and security system according to the invention. The description is given by way of example and does not limit the scope of the invention or of the protection claimed.

The reference numbers used below refer to the accompanying drawings.

The reference numbers in the different drawings refer to the same or analogous elements.

In a first embodiment of the method according to the invention, a user has a personal figure code X with n numbers Xi and a personal index I comprising r elements $i_i$, and a logic control device 1 generates p series of random numbers Ai. Once the user has indicated his desire to obtain access to the secured device, the logic control device 1 makes known to the user a first series A1 of q random numbers, together with the corresponding system index series J1. The user then compares the first element $i_i$ of his personal index I with the elements of the system index series J1. The user then notes the number $A1_{ji}$ whose corresponding index $j_i$ is identical to the element $i_1$, of the personal index I. This number is henceforth termed $A1i_1$. The user then enters a number Z1 in which forms the first number of the password Z and is the result of an operation F carried out on the first number X1 of the personal figure code X and the number $A1i_1$. In symbolic terms, this is noted as $Z1=F(X1, A1i_1)$. The operation F is known to the user or is communicated to the user by the logic control device 1. The logic control device 1 then checks whether the entered value Z1 is correct. If Z1 has not been entered correctly, access is denied; if Z1 is correct, the logic control device generates another series A2 of q random numbers and the previous step is repeated for the second number of the personal figure code X2, so that for the Z2 to be entered $Z2=F(X2, A2i_2)$. This is repeated for all elements Xi of the personal figure code X. When all numbers Zi of the password Z have been correctly entered, the security system permits access to the device by the user. It is also possible for the numbers Zi entered not to be checked by the control device until they have all been entered, in which case the user is not told that access to the device is refused until the full password has been entered.

The above method is illustrated by the following example. The personal code used is "GELD2378", where:

the letter word "GELD" forms the personal index I, with $i_1$=G, $i_2$=E, $i_3$=L and $i_4$=D; and the number "2378" forms the personal figure code X, with X1=2, X2=3, X3=7 and X4=8.

The user presses the start button on a keyboard 3 and computer 1, forming the logic control device, informs the user that for all Zi the rule is that $Zi = Aij_i + Xi$, where $Aij_i$ is the element of the i-th random series Ai having $j_i$ as the corresponding element of the system index series Ji, where $j_i$ is identical to the i-th element $i_i$ of the personal index I.

Figure 1:
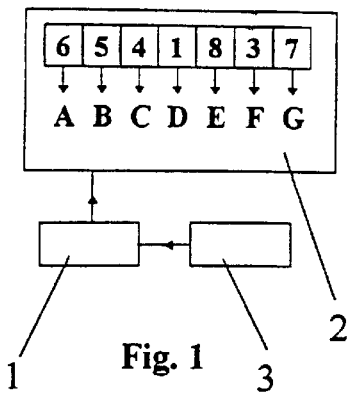
FIGS. 1 to 4 and 6 are schematic representations of a display screen with a random number series Ai and a random system index series Ji.

The user is presented with a screen 2 as shown in FIG. 1, with the numbers $A1j_1$=6, $A1j_2$=5, $A1j_3$=4, $A1j_4$=1, $A1j_5$=8, $A1j_6$=3 and $A1j_7$=7, where $j_1$=A, $j_2$=B, $j_3$=C, $j_4$=D, $j_5$=E, $j_6$=F and $j_7$=G are the corresponding elements of the system index series J1.

Figure 2:
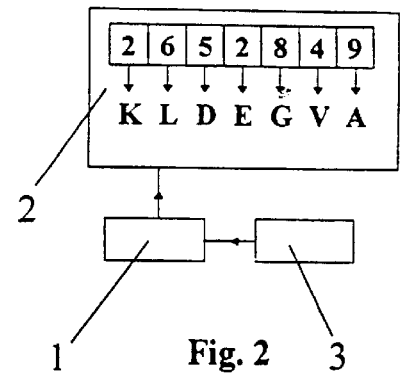
Figure 3:
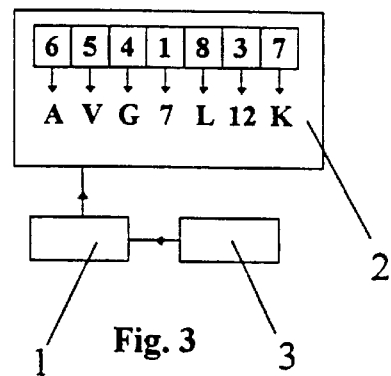
Figure 4:
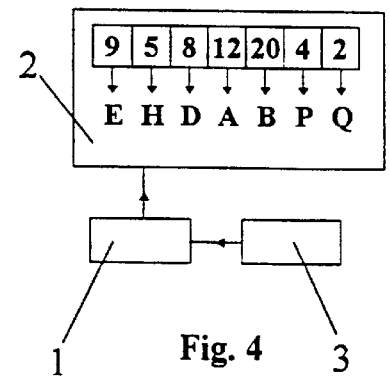

In order to calculate Z1, the user takes the number which as the corresponding element of the system index series J1 has an element identical to the first element $i_1$ of his personal index I. In this case $i_1$=G, so that the user has to choose the number $A1j_7$ for carrying out the operation, since $j_7=i_1=G$. He then enters the number $Z1$ where $Z1=A1j_7+X1=A1i_1+X1=7+2=9$. If this value $Z1$ is entered correctly, the computer 1 then gives a subsequent series $A2$ with random numbers, and a subsequent system index series $J2$ as shown in FIG. 2. The user has to choose the number $A2j_4=2$, since $i_2=j_4=E$. Accordingly, thus the number $Z2$ to be entered becomes $Z2=A2j_4+X2=2+3=5$. An analogous operation can be repeated for the numbers $Z3$ and $Z4$. FIGS. 3 and 4 respectively show the series $A3$ and $J3$, and $A4$ and $J4$. Accordingly the value $Z3$ to be entered$=A3i_3+X3=8+7=15$, and $Z4=A4i_4+X4=8+8=16$.

If the numbers $Zi$ of the password $Z$ are correctly entered, the computer 1 permits access by the user.

If desired, in a simplified embodiment of the method according to the invention, only one series of random numbers can be generated, where these are then used in the successive steps, or in other words $A1=A2=...=Ap$. In the same way it is possible to work with a constant system index series, in which case $J1=J2=...Jp$.

If the user's personal index $I$ has more elements than the number of numbers $Xi$ in the personal FIG. code $X$, or in other words if $r>n$, then for the other numbers $Xi$ with $n<i\leq r$ it is assumed that $Xi=0$. Accordingly, when for example $Zi=Aij_1+Xi$, in the i-th step the user will read the element $Aij_i$ corresponding to the i-th element of the index $I$ for $i>n$, and $Zi=Aij_1$.

If the figure code $X$ contains more numbers $Xi$ than the personal index $I$ has elements $i_i$, or in other words if $n>r$, then for $i>r$ in the above example $Zi=Xi$. In this case, in the embodiment described below the same element $i$ of the personal index $I$ is used for several numbers $Xi$ of the figure code $X$.

In a more complex embodiment of the method according to the invention, several elements of the personal index $I$ are used for calculating each number $Zi$, so that several numbers $Aij$ have to be chosen from each series $Ai$, and $Zi$ is accordingly calculated from several numbers $Aij$.

In a particular embodiment of the method according to the invention, a user wishing to be given access by the security system has a personal index $I$ consisting of only one element $i$ and a personal figure code $X$ comprising n numbers $Xi$. Once the user has made it known that he wishes to obtain access to the secured device, the logic control device 1 announces to the user a first series $A1$ of q random numbers, together with the corresponding system index series $J1$. The user then compares the single element $i$ of his personal index $I$ with the elements of the system index series $J1$. The user then notes the number $A1j$ whose corresponding index $j$ is identical to the element $i$ of the personal index $I$. Finally, the user enters a number $Z1$ that forms the first number of the password $Z$ and is the result of an operation $F$ carried out on the first number $X1$ of the personal figure code $X$ and the number $A1j$. In symbolic terms, this is noted as $Z1=F(X1, A1j)$. The operation $F$ used for this purpose is known to the user or is communicated to the user by the logic control device. The logic control device 1 then checks whether the value $Z1$ entered is correct for the user. If $Z1$ is not correct, access is denied; if $Z1$ is correct, the logic control device 1 generates a following series $A2$ of q random numbers, and the previous step is repeated for the second number of the personal figure code $X2$, so that for the value $Z2$ to be entered $Z2=F(X2, A2j)$. This step is repeated for all the numbers $Xi$ of the personal code. Once all the numbers $Zi$ of the password $Z$ have been correctly entered, the security system permits access by the user.

In this embodiment, the password $Z$ comprises n numbers $Zi$.

As an example of this embodiment, it is assumed that:
the random series $Ai$ is a series of seven numbers, i.e. $q=7$, as shown in FIGS. 1 and 2;
the mathematical function $F$ is an addition, chosen by the user or the system, so that $Zi=Xi+Ai$;
the user's particular code is D2357, where the letter D is the user's personal index $I$ and the figures 2357 form the user's personal figure code $X$.

The user presses the key on the keyboard 3 corresponding to the start function. The system then generates a first random series $A1$, consisting of the numbers 6, 5, 4, 1, 8, 3, 7. This series $A1$ is displayed with the corresponding system index $J1$, consisting of the letters A, B, C, D, E, F, G, for example on a screen 2. This is shown schematically in FIG. 1.

This gives $A1j_1=6$ with $j_1=A$, $A1j_2=5$ with $j_2=B$, $A1j_3=4$ with $j_3=C$, $A1j_4=1$ with $j_4=D$, $A1j_5=8$ with $j_5=E$, $A1j_6=3$ with $j_6=F$, and $A1j_7=7$ with $j_7=G$.

The user reads off the figure with system index $j_i$ corresponding to his personal index D, i.e. the figure $A1j_4$. He adds this figure, the FIG. 1, to the first number $X1$ of his figure code $X$, in this case 2. The result, the number 3, is the first figure $Z1$ of the password $Z$, and is entered by the user.

The computer then generates a second random series $A2$, being shown to the user simultaneously with the system index $J2$. The user reads off the figure $A2j_i$ lying opposite the system index $j_i$ corresponding to his personal index D. This figure is 5, as can be seen from FIG. 2. Since $X2=3$, the number entered is $Z2=X2+A2j_3=8$. This procedure is repeated until the last figure $Zn$ of the password $Z$ has been entered. In this example the first random series giving the system index $J1$ is different from the second random series giving the system index $J2$.

In a variant of this embodiment, a different operation $F$ for each step can be specified by the logic control device 1.

Another example of a method according to the invention is the case in which the personal code consists of the letter word "VEILIG" forming the personal index $I$, with all $Xi=0$. The user presses the start button and is shown a display 2, represented schematically in FIG. 3. The computer 1 instructs the user to enter a number $Z1$, calculated from the function $Z1=A1i_4*(A1i_1-X1)$, where $A1i_1$ is the number of the first random number having the system index $j_2=i_1=V$ and $A1i_4$ is the number of the first random series having the system index $j_5=i_4=L$. From FIG. 3 it can be deduced that $A1i_1=5$ and $A1i_4=8$, so that $Z1=5*8=40$, since $X1=0$. In this case the random system index series $J1$ comprises letters as well as numbers.

Once $Z1$ has been entered, a second random number series $A2$ and a random series $J2$ as system index are generated, as shown in FIG. 4. The computer instructs the user to enter the number $Z2=A2i_2+A2i_3$ with $A2i_2$ being the number of the second series having system index $j_1=i_2=E$, so that, since $A2i_2=9$, $A2i_3=8$ and $Z2=17$.

More generally, in this method each element $Zi$ of the password $Z$ can be calculated from several numbers $Aij$ of the same series $Ai$, without having to use a figure code $X$.

Yet another method according to the invention is illustrated on the basis of the following example of a personal code, namely "GELD2378", where:
the letter word "GELD" is the personal index $I$, with $i_1=G$, $i_2=E$, $i_3=L$ and $i_4=D$;
the number "2378" is the personal figure code $X$, with $X1=2$, $X2=3$, $X3=7$ and $X4=8$.

The user presses the start button and the computer informs the user that for all $Zi$ the rule is that $Zi=F(Aii_i, g(Xi, A(i-1)i_i))$, with for example:

$g(Xi, A(i-1)i_i) = Xi + A(i-1)i_i$ $F(Aii_i, g(Xi, A(i-1)i_i)) = Aii_i + g(Xi, A(i-1)i_i)$

Ai and A(i-1) being the i-th and (i-1)-th random number series $Aii_i$ and $A(i-1)i_i$ being the elements of the i-th and (i-1)-th random series having a system index identical to the i-th element $i_i$ of the personal index I.

The user is presented with a display as shown in FIG. 1, with a first series A0 of numbers $A0j_1=6$, $A0j_2=5$, $A0j_3=4$, $A0j_4=1$, $A0j_5=8$, $A0j_6=3$ and $A0j_7=7$, with $j_1=A$, $j_2=B$, $j_3=C$, $j_4=D$, $j_5=E$, $j_6=F$ and $j_7=G$ being the respective system codes.

The user enters the partial result $g(X1, A0i_1) = X1 + A0i_1 = 2+7=9$, as $X1=2$ and, since $J_7=i_1=G$, $A0i_1=7$. The computer then generates a display as shown in FIG. 2. The number $A1i_1=8$, so that $Z1=8+9=17$.

An analogous operation is repeated for the numbers Z2, Z3 and Z4. In this example, each of the numbers Zi of the password is calculated from a number in the series Ai and the series Ai-1, where $1 \leq i \leq n$.

In an interesting embodiment of the method according to the invention, it is possible to use a personal code containing a symbol assigned to the user, in which this symbol is only used in the first step of the method.

Figure 5:
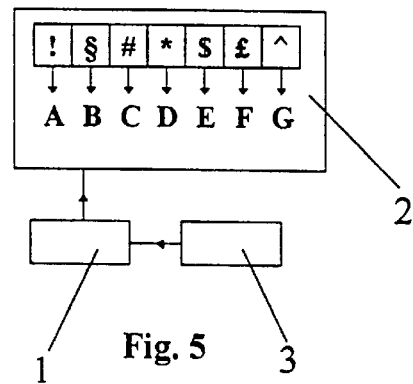
FIG. 5 is a schematic representation of a display screen with a random symbol series and a random system index series Ji.
Figure 6:
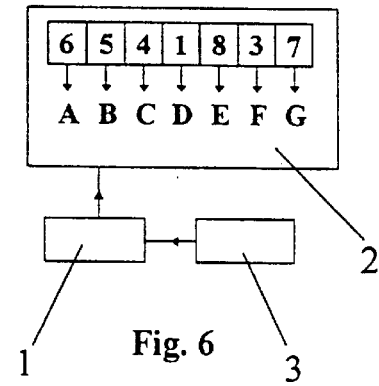

This is explained on the basis of the following example, with reference to FIGS. 5 and 6.

Suppose that the user's personal code is "§2357", with the sign "§" being a symbol assigned to the user, where the logic control device knows that this symbol belongs to the user, and 2357 is the personal figure code X;

the user function F is an addition.

The user presses the start button. The control device 1 displays a series of random symbols S on the screen 2, accompanied by a series of random system indexes. This is shown schematically in FIG. 5, where the system index series, called $J_0$, in this case consists of letters.

The user notes the system index $j_s$ located opposite his own symbol. This index $j_s$ will be used later to determine the numbers $Aij_I$ from a series Ai and the numbers of the password $Zi=F(Xi, Ai)$.

The user then lets the logic control device 1 know that he wishes to continue, for example by pressing a particular key on the keyboard 3, which for example is marked "OK". The control device 1 then generates a random number series A1 with the elements $A1j_1=6$, $A1j_2=5$, $A1j_3=4$, $A1j_4=1$ $A1j_5=8$, $A1j_6=3$ and $A1j_7=7$, where the series forming the system index J1 for this random number series consists of the elements $J_1=A$, $j_2=B$, $j_3=C$, $j_4=D$, $j_5=E$, $j_6=F$ and $j_7=G$. This is shown in FIG. 6.

If $Zi=F(Xi, Ai)=Xi+Aij_i$, then $Z1=XI+A1j_s=2+5=7$, since $X1=2$ and $A1j_s$ is the number, in this case 5, located above the index $j_i$, being identical to the randomly generated personal index $j_s$ of the user, in this case the letter "B". In the following steps of this method, the remaining numbers Zi of the password Z are calculated as in the method described above, in which the personal index I consists of only one element $i=i_s=j_s$, as described above.

In a particularly advantageous embodiment of the method according to the invention, the user has a personal code Y which, in addition to an index I and a personal figure code X, comprises an index operator B. Said index operator B consists of at least one number b, and makes it possible, partly on the basis of the index I, to determine which element from a series of random numbers should be used to form a password Z with the help of the figure code X.

When a user then wishes to gain access to a secured device, this is communicated to the logic control device or computer associated with said device. This computer then generates a series Ai of random numbers Aij, together with an index series Ji, in which to each number Aij there corresponds an index j in said index series Ji. One index j in the index series Ji corresponds to an element of the index I. In the first step, the user carries out a mathematical operation between number b of said index operator B and the number Aij having an index j corresponding to an element of the index I. The result of this operation yields a number representing a position in the series Ai. From the position thus determined, the user reads off the corresponding index j.

In the second step, a first number of the password Z to be entered is determined from this last index j together with the user's personal letter code X. For this purpose the logic control device generates a subsequent series Ai of random numbers Aij, together with a corresponding index series Ji and indexes j. The user then chooses the number Aij corresponding to the last index j determined by the user, and carries out a mathematical operation between the chosen number Aij and a number from his personal figure code X. The result of this operation determines the first number of the password Z.

The user determines the different numbers of the password Z by repeating step one and step two for each number of said password Z, each time using a subsequent number of the personal figure code X.

Different variants of this embodiment of the method according to the invention are possible. For example, in step two, for each number in the password it is possible to use the same number in the personal code X, if the latter consists of only one number or figure. The index operator B can also consist of one or more numbers and/or figures, and the index I of one or more letters and/or symbols. In this case a certain order for using said figures, numbers, letters or symbols has to be known to the user.

Figure 7:
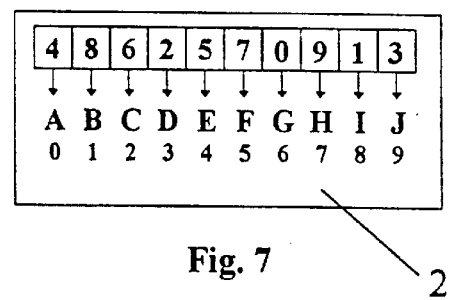
FIGS. 7 and 8 are schematic representations of a display screen with a random number series Ai and a random system index series, where the elements of the latter series are numbered.
Figure 8:
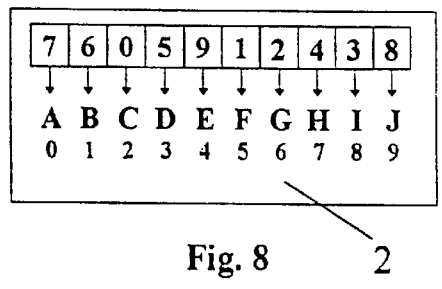

To illustrate these embodiments, reference is made to FIGS. 7 and 8, where the user is assumed to have "3C1624" as his personal code, and where the operation to be carried out by the user is an addition. In this case the personal index I has the letter "C" as its only element, the index operator B has the figure "3" as its only element, and the personal figure code X is formed by "1624". The user first presses a start button to indicate that he wishes to gain access to the secured system. The computer then generates a series Ai of random number Aij and displays it as shown in FIG. 7. Underneath this series Ai an index j is displayed for each figure Aij. In this case the index series Ji of indexes j is formed by an alphabetic series of the letters A to J. In this series Ji, for the sake of clarity the letters are numbered in sequence from 0 to 9. The user now chooses the figure Aij opposite the index j corresponding to his personal index I, namely "C". This is the figure "6". To this figure he adds the index operator b. This operation (6+3) yields the result 9. The user then reads off the letter in the ninth position of the index series Ji. This is the letter J. In a second step, a new series Ai of random figures is generated as shown in FIG. 8. From this series Ai the user chooses the figure Aij having as index j the letter J read in the previous step, namely the figure "8". An operation, in this case an addition, is carried out on this figure "8" and the first figure of the personal figure code X, in order to obtain the first number Z1 of the password Z to be entered in the computer. Accordingly, $Z1=8+1=9$. This number thus forms a first element of the password Z. To obtain the subsequent elements of the password Z, steps one and two are repeated, each time using the next number of the personal figure code X in the second step. Once the complete password Z has been entered, the user obtains access to the secured device. In this embodiment a series Ai preferably consists of ten different elements being permutated to form a new series Ai.

In the embodiments an example of which is illustrated in FIGS. 7 and 8, the index series Ji can be very varied, in the same way as is the case with the previous embodiment. The same applies to the position figures 0 to 9 corresponding to said index series Ji, which can be replaced by a random sequence of said figures. Preference is however given to a series Ji consisting of ten elements, in which the position figures are all different from each other. In such a case said position figures in fact play the role of an index.

Note that in the different examples given above, when carrying out an operation giving as a result a number consisting of more than one figure, while only one figure can be entered or used, the user should for example enter or use the modulus ten of this number. For example, when the series Ai on the screen 2 only contain seven random numbers, then modulus seven should be used. This last principle can be applied to all embodiments described in this description.

The invention is in no way limited to the embodiments of the method according to the invention described above and shown in the accompanying drawings, so that several variants can be considered within the scope of the invention.

Other possible examples of personal codes with an index I consisting of a single element are:

other combinations of a letter in the Arabic alphabet with several numbers, e.g. 45T75, where the letter T serves as personal index I. Symbols from other alphabets such as Greek, or symbols from other languages such as Japanese or Chinese, can also be used;

figure combinations with n figures, in which the number Ni in the i-th position (with i<n) functions as the index, e.g. 17805 or 22257, where e.g. the number in the third position, respectively 8 and 2, serves as the index I.

All representations which are not a figure, number or letter can also be used as elements of the personal index I. Possible examples are: musical notes, morse signs, small images (icons) of objects, plants or animals, etc.

It is possible for the user himself to program his own figure code X in the form of a series X1 . . . Xn, and also to program his own personal index I. This can be done decentrally, for example using an automatic cash dispenser.

The elements of the personal code Y can function as the figure code X and the index I simultaneously.

The function F can be any mathematical function, with preference being given to addition, subtraction, multiplication, division or a combination of these. Other possibilities are for example exponential functions, root extraction, trigonometric functions, certain integrals, etc. The function to be used can if desired be chosen by the user himself each time a password is to be entered. The function can also be altered randomly by the computer. The function should not be the same as multiplication or division by the number 1.

It is further possible, when the password Z consists of more than two figures, to vary the operation randomly or according to a certain order or pattern, in which e.g. the user is informed on the display what the following operation is. For a personal figure code X with 6 figures, it is for example possible to obtain the first, third and fifth figures of the password Z by e.g. addition, while the others are obtained by e.g. subtraction.

In yet another variant of the method according to the invention, the user is told by e.g. a voice or a message on the screen which number in the series Ai he must choose: for example, he is told that in order to calculate Z1 he must select the second number A12 in the first random series A1 and the fifth number A25 in the second series A2. The user can inform the control device 1 of his password by means of a keyboard, by speaking it in or in any other way.

Accordingly, the system index Ji can vary for each number Zi to be entered. The system index can also consist of a combination of numbers and/or letters and/or symbols. If desired, some system indexes $j_i$ can even be blank.

Although the method according to the invention is particularly suitable for application without any separate or personal equipment, it is also possible to use this method to improve existing security systems, for example those working with magnetic cards or voice recognition. The security system according to the invention is particularly advantageous for security on so-called information superhighways such as Internet, where the problem of electronic payment transactions remains unsolved due to the lack of sufficient security. Since most personal computers have software simulating a calculator, it is possible to use complex functions, which for example the user chooses from a menu, or which are randomly imposed by the security system computer.

The operations or functions mentioned in claim 1 can be extremely varied in nature. For instance, they can relate to different elements of the index and/or figure code simultaneously in order to obtain a particular element of the password.

It is also possible for the different embodiments described above to be combined, for example those according to FIGS. 7 and 8 with those according to FIGS. 5 and 6, FIGS. 3 and 4 and/or FIGS. 1 and 2.

What is claimed is:

1. A method of providing access to a secured system equipped with a logic control device (1,2,3) for determining the identity of a user of the system, comprising the steps of:

(a) providing the user with a secret personal code (Y) comprising an index portion (I) and a number code (X), the index portion consisting of at least one character and the number code consisting of a multi-digit number;

(b) generating in and displaying on the logic control device a series (Ai) of random numbers (Aij);

(c) determining, by the user, by means of an index element (Ii) of said index portion (I), a random number (Aij) in said displayed series, the index element designating the position of the random number being determined;

(d) applying, by the user, a function and/or an operation (F) to said number (Aij) determined by said index (I) and to an element of said number code, so as to obtain a new number, which can be different from that determined by said index (I);

(e) repeating the steps (c) and (d), all elements of said number code forming on the basis of said new elements a password Z;

(f) entering said password Z in said logic control device;

(g) controlling by means of said logic control device whether the correct password is entered, and giving access to the system secured by means of said logic control device if the correct password has been entered; and (h) using a personal code Y comprising an index operator B comprising at least one number making it possible to determine, with the help of the index I, which element from a series Ai of random elements Aij is used to form said password Z;

(i) generating a series Ai of random numbers with an index series Ji, wherein an operation is carried out between a number b of said index operator B and a number Aij of said series Ai, said number Aij corresponding to an index j of said index series Ji, where said index j corresponds to an element of the index I and the result of this operation determines a new index element indicating the number in a series of random numbers on which an operation is then carried out with at least a number of the personal figure code X in order to calculate a number Zi of the password Z to be entered.

2. A method of providing access to a secured system equipped with a logic control device (1,2,3) for determining the identity of a user of the system, comprising the steps of:
   (a) providing the user with a secret personal code (Y) comprising an index portion (I) and a number code (X), the index portion consisting of at least one character and the number code consisting of a multi-digit number;
   (b) generating in and displaying on the logic control device a series (Ai) of random numbers (Aij);
   (c) determining, by the user, by means of an index element (Ii) of said index portion (I), a random number (Aij) in said displayed series, the index element designating the position of the random number being determined;
   (d) applying, by the user, a function and/or an operation (F) to said number (Aij) determined by said index (I) and to an element of said number code, so as to obtain a new number, which can be different from that determined by said index (I);
   (e) repeating the steps (c) and (d), all elements of said number code forming on the basis of said new elements a password Z:
   (f) entering said password Z in said logic control device; and
   (g) controlling by means of said logic control device whether the correct password is entered, and giving access to the system secured by means of said logic control device if the correct password has been entered; characterized in that:
      before entering a number Zi of said password Z, a series of numbers Ai with q random numbers Ai is generated with q>2;
      at least one number of said series Ai is provided with a system index by said logic control device (1);
      the user enters as Zi a number $Zi=F(Aij_i)$, where $Aij_i$ is the number with a system index $j_i$ from said random series Ai, where the index $j_i$ is a system index being known or made known to the user; and
   characterized in that the system index $j_i$, forms part of a system index series Ji of k random indexes $j_1, j_2, \ldots j_i, \ldots j_k$, where the system indexes of said series Ji are symbols and/or numbers and/or letters, with $1 \leq k \leq q$, and correspond to a number Aij of the series Ai.

3. Method according to claim 2, characterised in that at least one element of the personal index I is always an element of said system index series Ji, and said number Aij is the number whose system index $j_i$ is the same as the element of the personal index I.

4. Method according to claim 2, characterised in that the random system index series Ji is the same for all $Zi=F(Xi, Aij)$.

5. Method according to claim 2, characterised in that the random system index series Ji is randomly generated anew for every $Zi=F(Xi, Aij)$.

6. A method of providing access to a secured system equipped with a logic control device (1,2,3) for determining the identity of a user of the system, comprising the steps of:
   (a) providing the user with a secret personal code (Y) comprising an index portion (I) and a number code (X), the index portion consisting of at least one character and the number code consisting of a multi-digit number;
   (b) generating in and displaying on the logic control device a series (Ai) of random numbers (Aij);
   (c) determining, by the user, by means of an index element (Ii) of said index portion (I), a random number (Aij) in said displayed series, the index element designating the position of the random number being determined;
   (d) applying, by the user, a function and/or an operation (F) to said number (Aij) determined by said index (I) and to an element of said number code, so as to obtain a new number, which can be different from that determined by said index (I);
   (e) repeating the steps (c) and (d), all elements of said number code forming on the basis of said new elements a password Z;
   (f) entering said password Z in said logic control device; and
   (g) controlling by means of said logic control device whether the correct password is entered, and giving access to the system secured by means of said logic control device if the correct password has been entered;
   characterized in that the personal index I consists of r elements $i_1, i_2, \ldots i_i, \ldots i_r$ with $r \geq 2$, and that for all Xi, Xi can be a positive or negative integer or decimal number or zero.

7. Method according to claim 6, characterised in that at least two elements $i_i$ and $i_u$ of the personal index I form part of the system index series Ji, with $i_u$ being the u-th element and $i_i$ the i-th element of I.

8. Method according to claim 7 characterised in that for at least one Zi at least one second function H is defined, so that $Zi=H(Aij_u, F(Xi, Aij_i))$, where
   $Aij_i$ is the random number of the series Ai having a system index $j_i$ being the same as the i-th element $i_i$ of the personal index I; and
   $Aij_u$ is the random number of the series Ai having a system index $j_u$ being the same as the u-th element $i_u$ of the personal index I.

9. Method according to claim 7, characterised in that for at least one Zi at least one second function H is defined such that $Zi=H(Aij_u, F(Xi, A(i-1)j_i))$ with $1 \leq i \leq p$, where:
   $A(i-1)j_i$ is the random number of the series $A(i-1)$ having a system index $j_i$ forming part of a random series $J(i-1)$ and having $j_i$ identical to the i-th element $i_i$ of the personal index I;
   $Aij_u$ is the random number of the series Ai having a system index $j_u$ forming part of a random series Ji and having $j_u$ identical to the u-th element $i_u$ of the personal index I; and
   the series Ai and the system index Ji are generated after the result $F(Xi, A(i-1)j_i)$ has been entered, where the series Ji and $J(i-1)$ are completely identical or completely different, or contain a number of identical elements.

10. A method of providing access to a secured system equipped with a logic control device (1,2,3) for determining the identity of a user of the system, comprising the steps of:
   (a) providing the user with a secret personal code (Y) comprising an index portion (I) and a number code (X), the index portion consisting of at least one character and the number code consisting of a multi-digit number;

(b) generating in and displaying on the logic control device a series ($A_i$) of random numbers ($A_{ij}$);

(c) determining, by the user, by means of an index element ($I_i$) of said index portion (I), a random number ($A_{ij}$) in said displayed series, the index element designating the position of the random number being determined;

(d) applying, by the user, a function and/or an operation F to said number ($A_{ij}$) determined by said index (I) and to an element of said number code, so as to obtain a new number, which can be different from that determined by said index (I);

(e) repeating the steps (c) and (d), all elements of said number code forming on the basis of said new elements a password Z;

(f) entering said password Z in said logic control device; and (g) controlling by means of said logic control device whether the correct password is entered, and giving access to the system secured by means of said logic control device if the correct password has been entered;

characterized in that the function $F(X_i, A_{ij}) = X_i * A_{ij}$ is used as the operation or function F, where "*" represents one of addition, subtraction, multiplication, and division.

* * * * *